No. 722,041. PATENTED MAR. 3, 1903.
G. C. PLUMMER.
CONVEYER BELT.
APPLICATION FILED NOV. 24, 1902.
NO MODEL.

Witnesses.
Robert Pratt.
V. Coombs

Inventor.
George C. Plummer.
By Wm. Stockbridge
Atty.

UNITED STATES PATENT OFFICE.

GEORGE C. PLUMMER, OF PHILADELPHIA, PENNSYLVANIA, ASSIGNOR TO MAIN BELTING COMPANY, OF PHILADELPHIA, PENNSYLVANIA, A CORPORATION OF PENNSYLVANIA.

CONVEYER-BELT.

SPECIFICATION forming part of Letters Patent No. 722,041, dated March 3, 1903.

Application filed November 24, 1902. Serial No. 132,678. (No model.)

*To all whom it may concern:*

Be it known that I, GEORGE C. PLUMMER, a citizen of the United States, residing at Philadelphia, in the county of Philadelphia and State of Pennsylvania, have invented certain new and useful Improvements in Conveyer-Belts, of which the following is a specification.

The ordinary form of canvas belt which is used for conveying purposes is made up of the same number of plies throughout its width, which are secured to each other by longitudinal rows of stitching located somewhat closely together. Furthermore, the belt as a whole is saturated with a composition of oils, gums, and the like, which has a tendency to dry and which when dry, or nearly so, causes the part saturated therewith to become more firm and less flexible. The belt is of uniform thickness throughout, and the stitches extend longitudinally through all the plies. The result is that the completed belt is comparatively stiff, rigid, and inflexible and is not well suited for use as a conveyer. The closer the rows of stitches are arranged to each other the more stiff and firm, or rather the less flexible, the belt becomes.

My invention is designed as an improvement upon this old form of stitched canvas belt, the object of the same being to provide a belt of this kind which is stable and firm along the central body portion thereof and which at the sides is capable of readily flexing or bending to assume a trough shape when passing over the usual guide-rollers employed.

The invention consists of a belt made up of a series of layers or plies of canvas connected together by longitudinal rows of stitching having a central body and flexible webs or side portions, the rows of stitching along the body extending through all the plies or layers of canvas, whereas a part of those along the flexible webs extend through two or more of the outer layers or plies only.

The invention also consists of a belt of this kind having its central body saturated with a stiffening drying composition of oils, gums, and the like and the webs saturated with a non-drying composition of oils, gums, and the like.

Other novel features of the invention will appear in the following description and claims.

Figure 1:
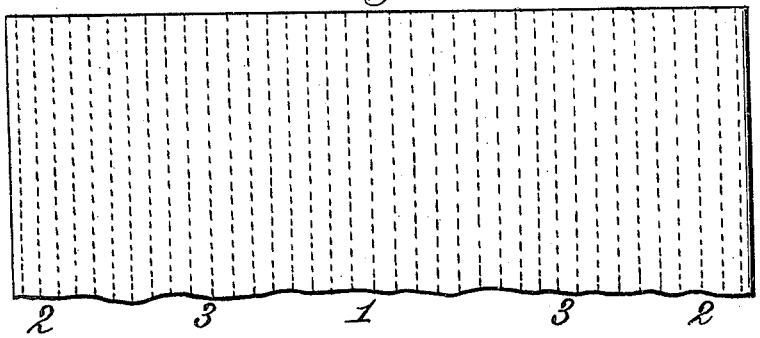
Figure 2:
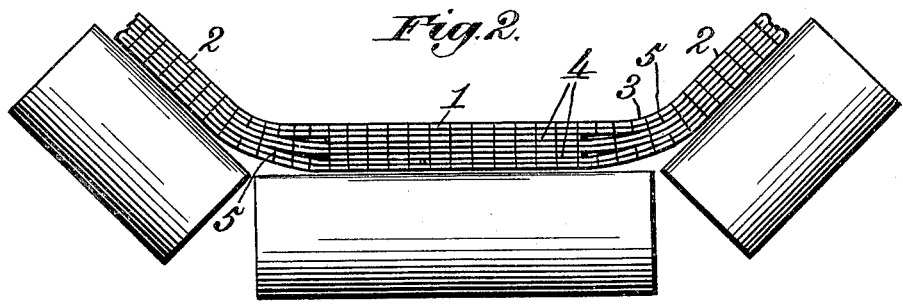
Figure 3:
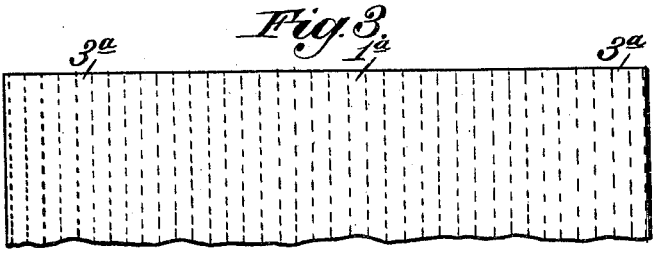
Figure 4:
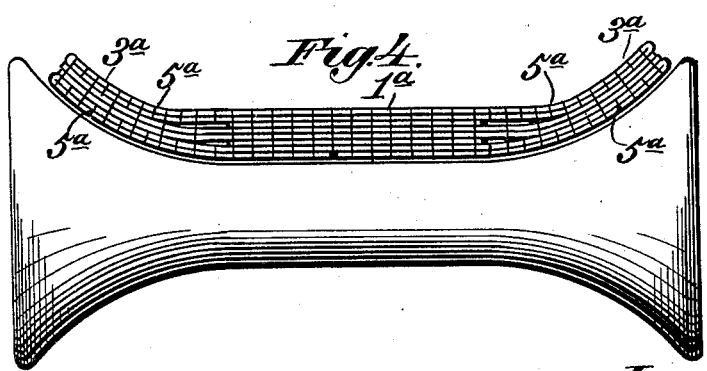

In the drawings forming part of this specification, Figure 1 is a face view of a conveyer-belt constructed in accordance with my invention. Fig. 2 is a transverse section of the same, shown in connection with the usual guide-rollers around which the belt passes. Fig. 3 is a view similar to Fig. 1, showing a modified construction; and Fig. 4 is a cross-section of the same.

Like reference-numerals indicate like parts in the different views.

My improved belt is made up of a central body 1, sides 2, and flexible webs 3, connecting said body and sides. The belt as a whole is constructed of a series of plies or layers of canvas connected together by longitudinal rows of stitching. The body 1 may be made thicker than the sides 2 and the webs 3 by the insertion of additional plies 4 therein. The stitches in the body 1 and in the sides 2 are located somewhat closely together and extend entirely through all of the plies of which these parts are made. The said stitches therefore serve to impart firmness and stability to the body and sides. Instead of extending all of the stitches in the webs 3 through all of the plies of which said webs are made a portion of said stitches 5 extend through only two or more of the outer layers or plies which go to make up said webs. Between the stitches 5 other stitches which extend through all of the plies of the material may be used.

It will of course be understood that the closer the stitches which extend entirely through all the plies are located together the more firm and stable the belt becomes. Conversely, the further removed the stitches are which extend through all the plies of the material the less stiff or more flexible the belt becomes. As the stitches which extend through all of the plies of canvas which go to make up the webs 3 are farther separated from each other than those which extend through the body 1 and the sides 2, it will be obvious that the said webs are more flexible than either said body or said sides. If the stitches be left out entirely, however, along the webs 3, said webs would be loose and flabby, and consequently this would be undesirable in a belt designed for conveying purposes. Furthermore, the stitches 5, which extend through only the outer layers or plies of the webs 3, tend to impart durability to the surface of the belt.

In the manufacture of my improved belt I propose to saturate the body 1 and the sides 2 thereof with a drying composition of oils, gums, and the like, which will when dry, or nearly so, impart greater firmness and stability to these parts. Furthermore, the webs 3 will be saturated with a non-drying composition of oils, gums, and the like, which has a less tendency to dry and harden, and consequently will preserve or add to the flexibility of said webs.

Instead of employing the sides 2, as above described, these parts may be entirely dispensed with. In such case the webs would be extended to the extreme side edges of the belt. Such a construction is illustrated in Figs. 3 and 4 of the drawings. In this form of my invention the belt is made up of a body 1ª and the webs 3ª only. The body 1ª is constructed in exactly the same manner as the body 1 in the first-described form of my invention, and the webs 3ª are constructed similar to the webs 3—that is to say, the longitudinal parallel rows of stitches in the body 1ª extend entirely through the layers or plies of which said body is made up, and the longitudinal rows of stitches 5ª in the webs 3ª extend only through two or more of the outer layers or plies of material, whereas longitudinal rows of stitches extending through all of the plies or layers of the webs 3ª are located between the rows of stitches 5ª. As in the former case, the body 1ª is saturated with a drying hardening composition of oils, gums, and the like, and the webs 3ª are saturated with a non-drying composition of oils, gums, and the like. The result is that a belt is produced which has a firm stable wear-resisting central body which is capable of withstanding the wear of the load when the belt is used as a conveyer and which has flexible side portions which are adapted to be bent upwardly by the usual guide-rollers to form the belt in the shape of a trough.

Linseed-oil and turpentine may be employed as the drying stiffening composition above referred to and olive or castor oil as the non-drying composition. Common resin or other suitable gum may also be used as one of the ingredients of both the drying and non-drying compositions.

Having now described my invention, what I claim as new, and desire to secure by Letters Patent, is—

1. A conveyer-belt having a central firm and unyielding body and flexible webs along the side edges thereof, the said belt being made up of a series of plies of canvas connected together by longitudinal rows of stitches, the stitches in said body extending through all of the plies thereof, and a portion of the stitches in said webs extending through two or more of the outer plies only.

2. A conveyer-belt, having a central firm and unyielding body and flexible webs along the side edges thereof, the said belt being made up of a series of plies of canvas connected together by longitudinal rows of stitches, the stitches in said body extending through all of the plies thereof, and a portion of the stitches in said webs extending through two or more of the outer plies only, the said body being saturated with a drying, hardening composition, and the said webs being saturated with a non-drying composition.

3. A conveyer-belt, having a firm, unyielding body, firm, unyielding sides, and flexible webs integral with said sides and body and connecting the same, the said belt being made up of a series of layers or plies of canvas secured to each other by longitudinal rows of stitching, the stitches in said body and in said sides extending through all the layers or plies thereof, and a portion of the stitches in said webs extending through two or more of the outer layers or plies thereof only.

4. A conveyer-belt, having a firm, unyielding body, firm, unyielding sides, and flexible webs integral with said sides and body and connecting the same, the said belt being made up of a series of layers or plies of canvas secured to each other by longitudinal rows of stitching, the stitches in said body and in said sides extending through all the layers or plies thereof, and a portion of the stitches in said webs extending through two or more of the outer layers or plies thereof only, the said body and the said sides being saturated with a drying, stiffening composition and the said webs being saturated with a non-drying composition.

In testimony whereof I have hereunto set my hand in presence of two subscribing witnesses.

GEORGE C. PLUMMER.

Witnesses:
J. B. JARDELLA,
H. J. ROTH.